(12) United States Patent
Christensen (10) Patent No.: US 11,716,139 B1
(45) Date of Patent: Aug. 1, 2023

(54) TRANSPORT DATA STRUCTURE USEFUL FOR TRANSPORTING INFORMATION VIA A FREE SPACE OPTICAL LINK

(71) Applicant: L3Harris Technologies, Inc., Melbourne, FL (US)

(72) Inventor: L. Carl Christensen, South Jordan, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 0 days.

(21) Appl. No.: 17/675,013

(22) Filed: Feb. 18, 2022

(51) Int. Cl.
*H04B 10/00* (2013.01)
*H04B 10/079* (2013.01)
*H04L 1/00* (2006.01)
*H04B 10/114* (2013.01)

(52) U.S. Cl.
CPC ... *H04B 10/07953* (2013.01); *H04B 10/1143* (2013.01); *H04L 1/0072* (2013.01)

(58) Field of Classification Search
CPC .......... H04B 10/1143; H04B 10/1149; H04B 10/116; H04B 10/118; H04B 10/114; H04B 10/112; H04B 10/40; H04B 10/2507; H04B 10/07953; H04B 10/5055; H04B 10/516; H04L 1/0072; H04L 1/1845
USPC ....... 398/118, 119, 127, 128, 130, 129, 131, 398/135, 136, 172, 158, 159, 183, 188, 398/202, 208, 209, 25, 26, 27, 33; 375/340, 341, 262, 316
See application file for complete search history.

(56) References Cited

U.S. PATENT DOCUMENTS

| | | | |
|---|---|---|---|
| 5,539,846 A * | 7/1996 | Morikura | H04J 3/0623 398/154 |
| 7,243,296 B2 | 7/2007 | Christensen | |
| 8,788,911 B1 * | 7/2014 | Wu | H03M 13/2906 714/755 |
| 9,698,939 B2 * | 7/2017 | Oveis Gharan | H04B 10/516 |
| 2011/0002695 A1 * | 1/2011 | Choi | H04B 10/116 398/155 |

* cited by examiner

*Primary Examiner* — Hanh Phan
(74) *Attorney, Agent, or Firm* — Workman Nydegger (57) ABSTRACT

Processing signals is disclosed. A method includes receiving a signal transmission with a nb/mb encoding scheme that maps n-bit words to m-bit symbols. In this scheme, m>n. The method further includes, for a first payload data word in the transmission, determining that the first payload data word corresponds to a valid payload data word, and as a result, assigning a first reliability metric to bits in the first payload data word. The method further includes for a second payload data word in the transmission, determining that the second payload data word does not correspond to a valid payload data word, and as a result, assigning a second reliability metric to bits in the second payload data word. The method further includes performing signal decoding using the assigned reliability metrics.

20 Claims, 3 Drawing Sheets

TRANSPORT DATA STRUCTURE USEFUL FOR TRANSPORTING INFORMATION VIA A FREE SPACE OPTICAL LINK

BACKGROUND

Background and Relevant Art

Modern communication techniques are varied and widespread. In particular, various wired, wireless, fiber-optic optical, and free space optical techniques exist for communication. Further, communications can be accomplished between various communication nodes including various combination of ground nodes, air nodes, and/or satellite nodes.

There is also a need for keeping communications secure, including keeping communications private and/or free from tampering. Further, there is a need to keep communications from being intentionally or unintentionally blocked, jammed, or otherwise interfered with. Thus, various techniques, such as encryption, forward error correction (FEC), and the like have been implemented to accomplish these goals.

However, there is a constant need to improve communication transmission and reception, whether based on improved interception and interference by nefarious individuals, or simply to improve the efficiency and effectiveness of communications systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of processing signals. The method includes receiving a signal transmission with a nb/mb encoding scheme that maps n-bit words to m-bit symbols. In this scheme, m>n. The method further includes, for a first payload data word in the transmission, determining that the first payload data word corresponds to a valid payload data word, and as a result, assigning a first reliability metric to bits in the first payload data word. The method further includes for a second payload data word in the transmission, determining that the second payload data word does not correspond to a valid payload data word, and as a result, assigning a second reliability metric to bits in the second payload data word. The method further includes performing signal decoding using the assigned reliability metrics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to accomplishing communication in a fashion that improves various encoding, encryption, and/or FEC techniques. In particular, data can be transmitted using an encoding technique where a signal transmission is encoded with a nb/mb encoding scheme that maps n-bit words to m-bit symbols, where m>n. One example of this is the 8B/10b encoding scheme.

When such a signal is received through a channel, channel effects may cause errors in the signal. For certain FEC schemes, a reliability metric, such as a log likelihood ratio (LLR) can be used to facilitate the FEC, where the reliability metric provides an indication as to likelihood of a bit (or symbol) being without error. Embodiments illustrated herein are able to assign a reliability metric for various bits based on evaluation of payload data words received in the signal.

In particular, a given transmission using a particular encoding scheme has expected payload data words and expected flag words. Expected payload data words are data words that are valid data words that might be sent in the data payload. That is, payload data words should contain the useful data that will be used by the recipient, rather than data that is used as part of the data transmission and reception process. In contrast, flag words are used for framing and other tasks, such as for marking the start and end of data frames, to transmit comma characters between frames for alignment, to transmit clock correction characters, to mark the start of a sub data frame, etc. Further, certain encoding schemes may be such that they exhibit a tendency to achieve DC-balance whereby bits are transmitted in a fashion so as to cause the mean amplitude of a waveform to be zero, and thus have no DC bias. A disparity error can be detected in a payload data word when the payload data word tends to move the signal away from DC-balance.

Embodiments illustrated herein can assign a relatively high reliability metric for one or more bits in a payload data word that matches an expected payload data word. Bits in a payload data word may be assigned a low reliability metric for one or more bits in a payload data word that matches a known flag word (when a data word is expected) or that does not match any expected payload data words, inasmuch as it can be determined that bits in the payload data word are obviously incorrect as they do not match an expected payload data word.

In some embodiments, an intermediate level reliability metric may be assigned for one or more bits in a payload data word for a word that tends to cause a disparity error, particularly when the disparity error is of a level that tends to indicate only a single bit error. Generally, disparity errors tend to be caused by payload data words that have a single bit error. Thus, most of the bits in the payload data word that causes a disparity error are likely to be correct.

Figure 1:
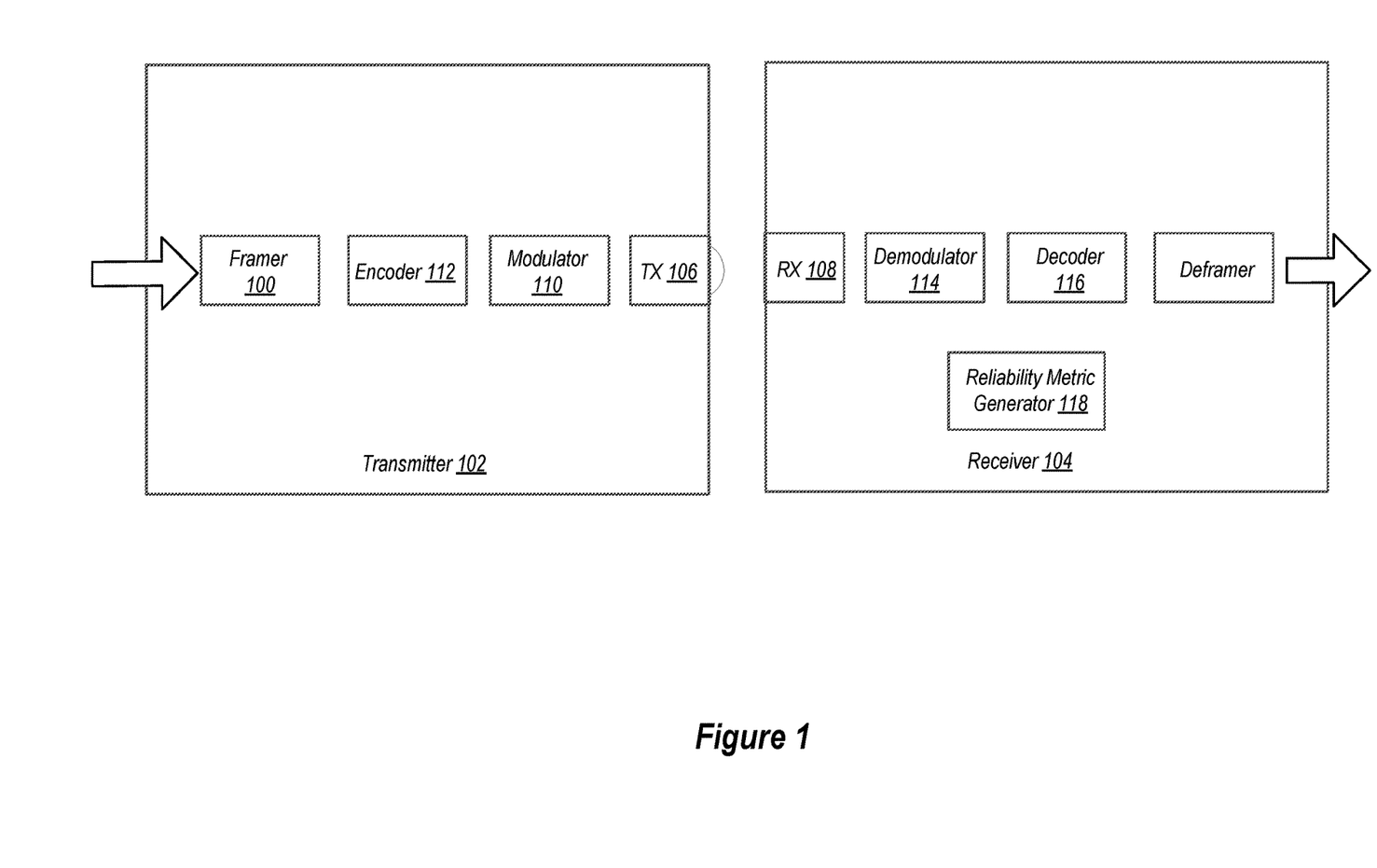
FIG. 1 illustrates a transmitter and receiver configured to communicate using transmissions encoded using an nb/mb encoding scheme, where the receiver comprises a reliability metric generator configured to generate reliability metrics based on evaluation of received codewords.

Additional details are now illustrated. Referring now to FIG. 1, an example system is illustrated. In the example illustrated in FIG. 1, information is transported via a free space optical link from an optical transmitter 102 to an optical receiver 104. For example, to transport information via a free space optical link at rates from 1 to 28 Gbits per second, embodiments may use commonly available networking optical components such as Small Formfactor Pluggable (SFP) modules as the electrical to optical transducers and optical to electrical transducers to convert electronic signals to optical signals and vice versa respectively. For example, the transmitter 102 comprises a transmitting transducer 106 that converts electrical signals to optical signals. The receiver 102 comprises a receiving transducer 108 that converts optical signals to electrical signals. The transmitting transducer 102 and receiving transducer 108 may be, for example, optical SFPs. Alternatively, or additionally, the receiving transducer 108 may include, for example, a photodiode and comparator.

Note that while the transmitter 102 and receiver 104 appear in FIG. 1 to be in very close proximity, in practice, the transmitter 102 and receiver 104 may be quite distant from each. For example, embodiments can be implemented where the transmitter 102 is hundreds, or even thousands (e.g., in free-space optical cross links used in satellite communications) of miles from the receiver 104.

Some embodiments use on/off keying modulation and demodulation paired with Low-Density Parity Check (LDPC) forward error correction for free space optical communications. In some example embodiments illustrated herein, nb/mb (e.g., 8b/10b) decoding errors can be used for assigning, determining and/or calculating reliability metrics for LDPC decoders. Additionally, using of 8b/10b k characters for the wave form sync-word and idle sequence can provide relatively quick lock/relock which is beneficial in deep fading environments, such as those caused by atmospheric scintillation. Some embodiments illustrated herein are designed with an ability to transport data over free space using low cost integrated optical fiber to electrical modules intended for fiber optic networks. 10 Gbit SFP modules are one example of such modules. In some embodiments, sync patterns can be optimized for both usefulness in a high scintillation and ease/cost of implementation.

In some embodiments, using free space optical communications, systems can implement communications that are protected in that they have a low probability of detection, low probability of interception, low probability of jamming, and/or low probability of geo location. In particular, free space optical communications can be implemented in a fashion where spread of the signal is extremely low as compared to radio communications. Due to the low spread, a nefarious entity would have to physically locate the very small space which a signal is being transmitted to detect, intercept and/or jam a signal. Further, due to the on/off nature of free space communications, such communications may be time limited as well. This becomes akin to the literal needle in a haystack problem. For example, if a free space optical signal were transmitted from New York City to Washington DC (a distance of nearly 330 miles), the signal spread would only be about a 3 foot spread. In contrast, signals transmitted using traditional radio signals, assuming no radiation shaping, would have a spread that is over 6 times the 330 mile distance, and emitted in every direction, thus making the signal very easy to intercept and jam, absent other countermeasures. Thus, embodiments may use free space optical links in useful ways as described previously.

Illustrating now additional details, modulation and PHY layer framing are described for some embodiments of the invention. In some embodiments, modulation is performed by a modulator 110 modulating the transmitting transducer 106. The modulator modulates using on/off keying such that the transmitting transducer 106 produces presences of light which, in one positive logic encoding scheme, is interpreted as a 1, while no light is interpreted as a zero.

Data is encoded by an encoder 112 using nb/mb encoding, which as discussed above, in some embodiments is 8b/10b. This encoded data is provided to the modulator 110, which modulates the transmitting transducer 106 as described above.

In one such example, flags and idle sequences comprise one 8b/10b k character (e.g., K28.5) followed by three normal symbols (e.g., D9.5) In some embodiments, flags have a negative beginning running disparity. This allows idles to be removed and added without altering the beginning running disparity of the preceding word.

Using nb/mb encoding (and in particular in some embodiments 8b/10b encoding) can be advantageous for several reasons. For example, this allows framing and alignment of the on/off keying (OOK) demodulator to be done by an existing Field-Programmable Gate Array (FPGA) SERDES for use with standardized SFP modules.

Alternatively, or additionally, this encoding syncs up very quickly as compared to other encoding methods. Free space optical links are impacted by fading due to differences in atmospheric pressure. Such fades can be greater than 35 db, ideally. The clock data recovery will be able to "coast" thru such fading. In the event that it is unable to, and clock lock is lost, having an encoding scheme that locks quickly limits the impact of the deep fades.

Alternatively, or additionally, this encoding is advantageous in generation of reliability metrics, such as log likelihood ratios (LLRs), also commonly reffered to as soft data. LDPC error correction works better when a probability of the received value of each bit can be determined. As will be illustrated in more detail below certain conditions may be used for assignment and/or calculation of reliability metrics. In particular, nb/mb disparity errors, not in table errors, and presence of a k-character when a data payload word is expected, can be used to generate reliability metric data.

In particular, attention is now directed once again to FIG. 1, which illustrates additional details regarding the receiver 104. The receiver 104 receives signals from the transmitter 102. In particular, the receiving transducer 108 receives signals transmitted by the transmitting transducer 106 and converts the optical signal to electrical signals. Note that the signals may have been corrupted between the transmitter 102 and receiver 104, or in some other location along the transmission path. This corruption can be detected and/or corrected using FEC techniques. In some embodiments, those FEC techniques can be aided by assigned and/or computed reliability metrics used in soft decoding techniques.

FIG. 1 illustrates that the receiver includes a demodulator 114. The demodulator 114 demodulates electrical signals from the receiving transducer 108 to produce an nb/mb encoded signal. This nb/mb encoded signal is provided to a decoder 116, which has a primary function of decoding the nb/mb encoded signal into flags or valid data words.

FIG. 1 further illustrates a reliability metric generator 118. The reliability metric generator 118 is coupled to the decoder 116. The reliability metric generator 118 and decoder 116 work in concert to produce reliability metrics based on the nb/mb words received by the receiver 104. In particular, the receiver receives a signal transmission, the signal transmission having been encoded with a nb/mb encoding scheme that maps n-bit words to m-bit symbols, where m>n. For a first payload data word in the transmission, the decoder 116 and/or the reliability metric generator 118 determine that the first payload data word corresponds to a valid payload data word. As a result, the reliability metric generator 118 assigns a first reliability metric to bits in the first payload data word. The reliability metric is a probability that the first payload data word is correct, i.e., that the first payload data word is the same data word sent by the transmitter 102.

For a second payload data word in the transmission, the decoder 116 and/or the reliability metric generator 118 determine that the second payload data word does not correspond to a valid payload data word. As a result, the reliability metric generator 118 assigns a second (typically lower) reliability metric to bits in the second payload data word. Signal decoding is then performed at the receiver using the assigned reliability metrics. Signal decoding may be, for example, LDPC decoding, which makes use of the reliability metrics using soft decoding techniques can be performed.

Figure 2:
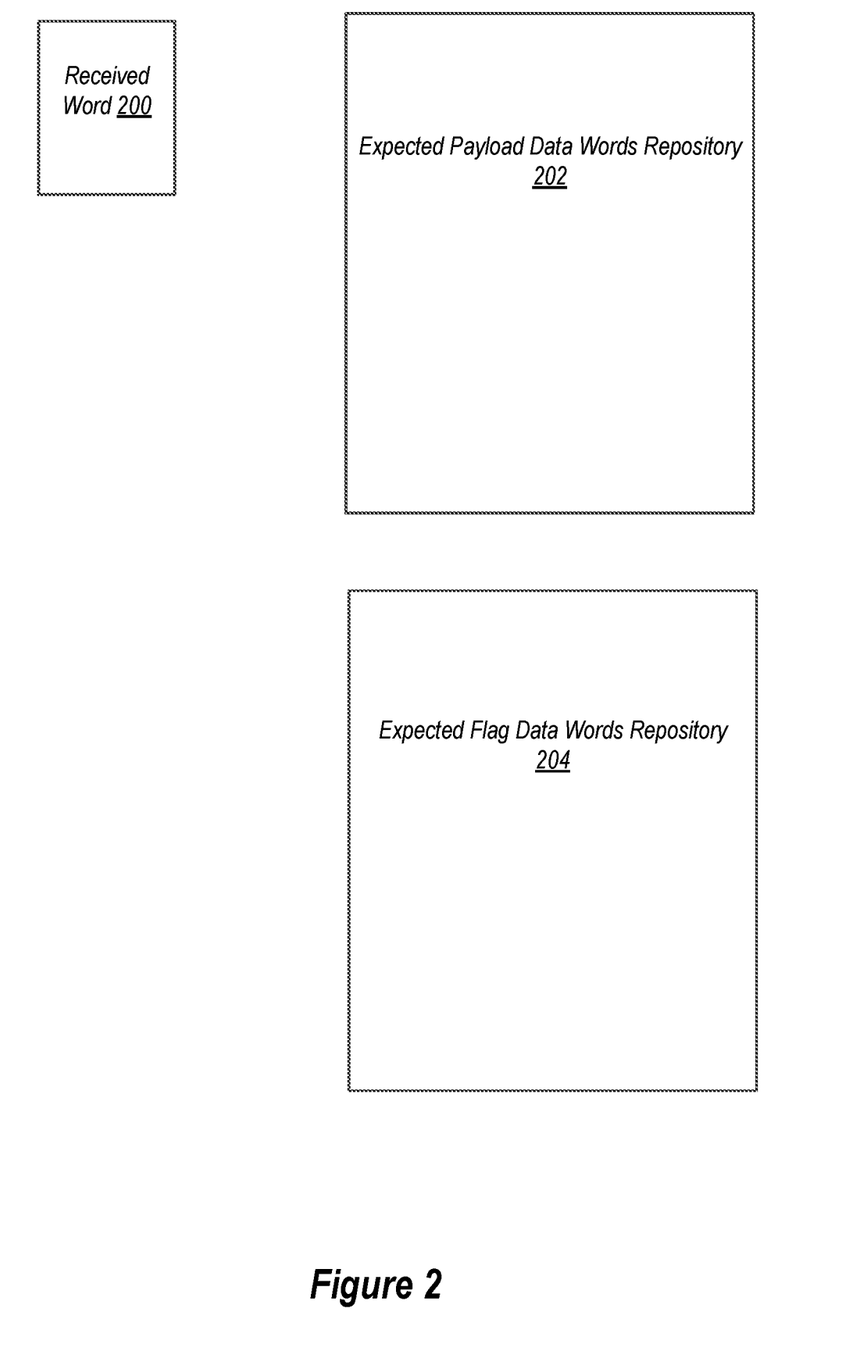
FIG. 2 illustrates an expected payload data words repository and an expected flag data words repository included in a receiver for comparing received words to entries in the repositories.

In some embodiments, determining that the first payload data word corresponds to a valid payload data word includes matching the first payload data word to a payload data word in a list of known payload data words. For example, as illustrated in FIG. 2, the receiver 104 may include an expected payload data words repository 202 which contains a dictionary or index of all valid data words that are expected by the receiver 104. A received word 200 can be compared to the entries in the expected payload data words repository 202. If the received word does not match any of the entries in the expected payload data words repository 204, then assignment of a reliability metric to the received word 200 can be assigned based on this determination. In particular, typically a received word 200 will be assigned a lower reliability metric if no entry for the received word is found in the expected payload data words repository 202 than if an entry for the received word is found in the expected payload data words repository 202. Thus, in some embodiments, determining that the second payload data word does not correspond to a valid payload data word comprises failing to match the second payload data word using comparisons to payload data words in a list of known payload data words.

In some such embodiments, a determination can be made as to how many bit or symbol flips need to be performed to make a received word match a valid data word in the expected payload data word repository 202. The more symbol or bit flips that need to be performed to make a received word match a valid data word, the lower the value of the reliability metric that can be assigned to the bits of the received word. For example, a received word that only requires a single bit flip to create a valid data word will have a higher reliability metric assigned than a received word that requires multiple bit flips to create a valid data word.

Illustrating now an alternative method of determining reliability metric using bit flips, Embodiments can determine various bit flips that, when performed on the received word 200, would lead to a valid data word (such as a data word included in the expected payload data words repository 202) and then use information about which bits can be flipped to assign reliability metrics for the individual bits of the received word 200. For example, if there are three different valid symbols that would be obtained by flipping one bit, the decode of those three symbols is used to set the reliability metric for the individual bits of the received word. This approach can be expanded to look for valid symbols from 2, 3 or more bit flips.

In some embodiments, determining that the second payload data word does not correspond to a valid payload data word comprises matching the second payload data word to a known flag word using comparisons to flag words in a list of known flag words. For example, FIG. 2 illustrates the receiver 104 may include an expected flag data words repository 204 which contains a dictionary or index of all valid flag data words for the nb/mb encoding that are expected by the receiver 104. A received word 200 can be compared to the entries in the expected flag data words repository 204. If the received word matches any of the entries in the expected flag data words repository 204, then assignment of a reliability metric to the received word 200 can be assigned appropriately. In particular, typically a received word 200 will be assigned a lower reliability metric if an entry for the received word is found in the expected flag data words repository 204, as this indicates that it is not a valid data word.

In some embodiments, determining that the second payload data word does not correspond to a valid payload data word comprises determining that the second payload data word comprises a disparity error. That is, in typical nb/mb coding, it is desired that DC-balance is achieved. This is achieved by causing bits to be transmitted in a fashion so as to cause the mean amplitude of a waveform to be zero, and thus having no DC bias. A disparity error can be detected in a payload data word when the payload data word tends to move the signal away from DC-balance. Thus, in some embodiments, determining that the second payload data word comprises a disparity error comprises identifying a DC-balance error.

In some embodiments, assigning a second reliability metric to bits in the second payload data word includes assigning a higher reliability metric, when assigned due to disparity error, that is larger than a reliability metric that would be applied if the second payload word failed to match payload data words using comparisons in a list of known payload data words or if the second payload word matched a known flag word in a list of known flag words. That is, if a reliability metric is assigned due to a disparity error, that reliability metric may be higher than one assigned due to a received word not matching expected payload data words or matching expected flag data words. Note that in some embodiments, the size of the disparity error may affect the assigned reliability metric. Thus, for example, a higher disparity error causing a higher DC bias may result in a lower reliability metric than a lower disparity error with a lower DC bias.

In many ways nb/mb encoding, such as 8b/10b overhead, may already be similar to FEC coding overhead, in that it costs some bandwidth but brings other benefits. Thus, leveraging the features of nb/mb encoding, FEC coding can be implemented using existing functionality of SERDES FPGAs and SFP modules.

Embodiments may be implemented where communication waveforms are made up of data frames, subchannel frames and idle sequences. Data and sub channel frames may include, for example, a sequence number, a type field, the data frame payload, an end of framer flag, etc. The payload of a data frame may be sized for appropriate encoding. For example, in one embodiment, data frames contain 1020 8b/10b symbols to implement an 8160 bit LDPC code block.

The data type field can be used, for example, to indicate different data types. In some embodiments, the data type field may be used to indicate different LDPC codes.

A second type of frame, as noted above, is the sub channel data frame or subdata frame. It is similar to the data frame but has a smaller payload. In one embodiment, the payload of the sub data frame is 256 symbols (2048 bits before 8b/10b encoding).

Sub channel and sub channel data frames can be used, for example, to carry control and status data between nodes. The payload of the sub channel data frames used for internode communication can be encoded in a strong LDPC code, such as ½ rate code.

Embodiments may implement certain frame spacing. For example, in some embodiments, a minimum of two idle sequences will follow any data or sub channel frame. That is, any two frames are separated by at least two idle sequences. In some embodiments, idle sequences will be transmitted whenever there are no frames available for transmission.

Embodiments may be implemented where data and sub frames can be intermixed.

In one specific embodiment, 8b/10b not in table errors, disparity errors and unexpected is a k character assertions will be used in generating of the reliability metrics. A symbol that decodes as a valid 8b/10b symbol has a high probability of being correct. A symbol with a disparity error likely has one or more wrong bits. A symbol which decodes as not in table or as an unexpected k-character has a higher probability of multiple bit errors.

A simple reliability metric coding scheme is implemented using just this data. Consider the following rules in one simple example: (1) Bits that were decoded from a valid symbol are assigned a high reliability metric; (2) bits decoded from a symbol with a disparity error are assigned a medium reliability metric; (3) bits that are represented by a 'not in table' or an unexpected k character are set to the lowest reliability metric.

Some embodiments may assign reliability metrics based on information about a transmission path favoring one logic state over another. For example, in many optical embodiments, in the absence of significant ambient light near the communication wavelength or in the absence of optical amplification, the odds of light being detected in the wrong location (e.g., an invalid one, assuming positive logic) is much less than light not being detected where it should (e.g., an invalid zero, assuming positive logic). This can be used when generating the reliability metrics. That is, reliability metrics for a given received bit may be assigned differently depending on whether the received bit is a logical one or a logical zero based on characteristics of the transmission path that tend to favor one logical state over the other.

In some embodiments, it may be advantageous to compute and/or assign reliability metrics based on a combination of operations performed in a particular order. For example, in some embodiments, a disparity error check can be performed. If a disparity error is discovered, then bit flipping is performed to determine if an expected payload data word can be recovered by only flipping one bit. If an expected payload data word cannot be recovered by only flipping one bit, then a relatively low (as compared to some metric, such as a metric that would be assigned absent bit flipping or a metric that would be assigned when a received word is an expected data word) reliability metric is assigned. If an expected payload data word can be recovered by only flipping one bit, then a relatively high reliability metric is assigned. Note that if the disparity error is sufficiently large to indicate that two or more bits are likely incorrect, then multiple bits can be flipped, and reliability metrics assigned accordingly.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
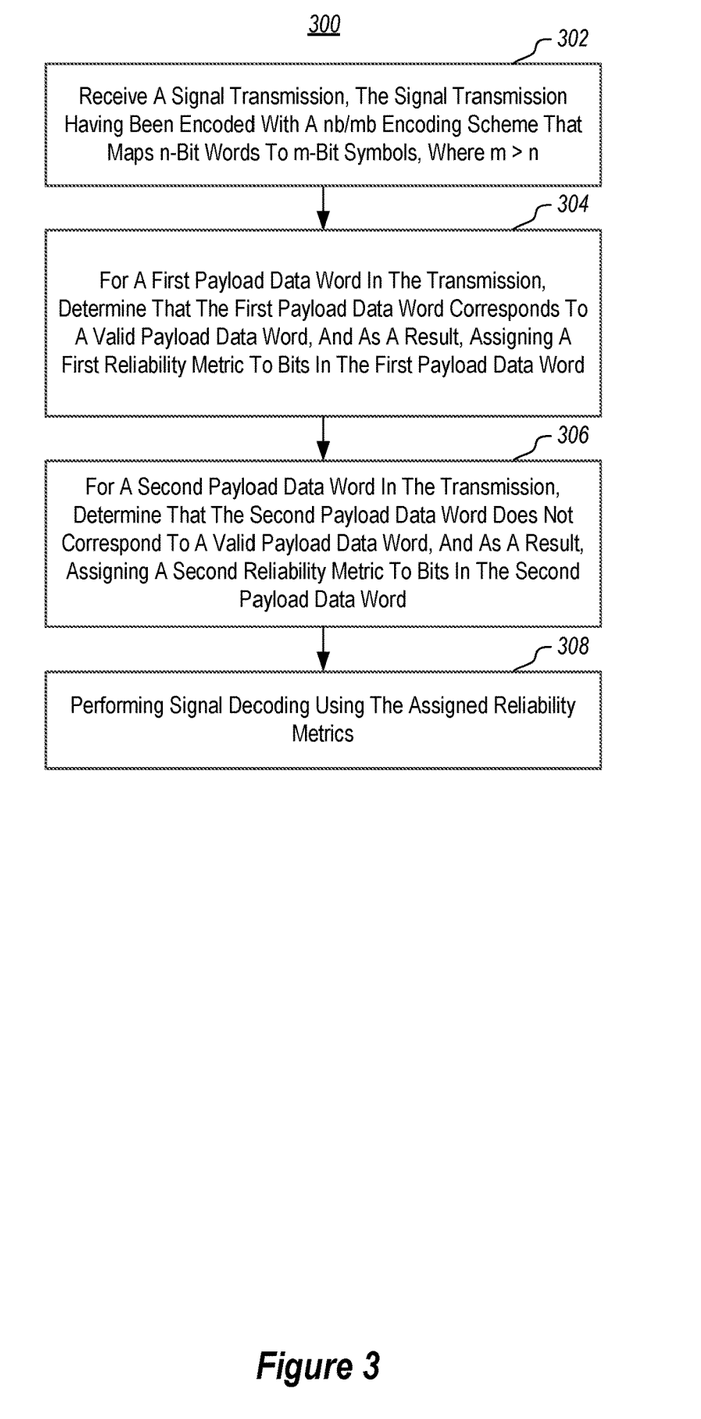
FIG. 3 illustrates a method of processing signals.

Referring now to FIG. 3, a method 300 is illustrated. The method 300 includes acts for processing signals. The method 300 includes receiving a signal transmission, the signal transmission having been encoded with a nb/mb encoding scheme that maps n-bit words to m-bit symbols, where m>n (act 302). For example, this may include receiving a signal transmission transmitted in the 8b/10b encoding scheme.

The method 300 further includes, for a first payload data word in the transmission, determining that the first payload data word corresponds to a valid payload data word, and as a result, assigning a first reliability metric to bits in the first payload data word (act 304). For example, the first reliability metric may be an LLR.

The method 300 further includes, for a second payload data word in the transmission, determining that the second payload data word does not correspond to a valid payload data word, and as a result, assigning a second reliability metric to bits in the second payload data word (act 306). Thus, reliability metrics are assigned based on whether or not a received data word corresponds to a valid payload data word.

The method 300 further includes, performing signal decoding using the assigned reliability metrics (act 308). For example, LDPC or other FEC decoding can be performed based on the reliability metrics.

The method 300 may be practiced where determining that the first payload data word corresponds to a valid payload data word comprises matching the first payload data word to a payload data word in a list of known payload data words. Examples of this are illustrated in FIG. 2, when a received word 200 is found in the expected payload data words repository 202.

The method 300 may be practiced where determining that the second payload data word does not correspond to a valid payload data word comprises failing to match the second payload data word using comparisons to payload data words in a list of known payload data words. Examples of this are illustrated in FIG. 2, when a received word 200 is not found in the expected payload data words repository 202.

The method 300 may be practiced where determining that the second payload data word does not correspond to a valid payload data word comprises matching the second payload data word to a known flag word using comparisons to flag words in a list of known flag words. Examples of this are illustrated in FIG. 2, when a received word 200 is found in the expected flag data words repository 202. Thus, if a payload data word is expected, but a flag data word is found, it can be determined that the received word has errors, and thus an appropriate reliability metric can be assigned.

The method 300 may be practiced where determining that the second payload data word does not correspond to a valid payload data word comprises determining that the second payload data word comprises a disparity error. In many nb/mb encoding schemes, encoding is performed to eliminate DC bias by having a DC balance. Detecting DC bias detects a disparity error, and therefore, an error in the received word. Thus, in some embodiments, determining that the second payload data word comprises a disparity error comprises identifying a DC-balance error.

In some such embodiments, assigning a second reliability metric to bits in the second payload data word comprises assigning a higher reliability metric that is larger than a reliability metric that would be applied if the second payload word failed to match payload data words using comparisons in a list of known payload data words or if the second payload word matched a known flag word in a list of known flag words. Thus for example, a higher reliability metric is assigned for received words that match expected data words, an intermediate reliability metric is assigned for received words with disparity errors, and a lower reliability metric is assigned for received words that do not match expected data words.

The method 300 may be practiced where the signal transmission comprises a free space optical transmission.

The method 300 may further include performing one or more bit flips on the second payload data word to attempt to identify an expected data word, and wherein assigning the second reliability metric to bits in the second payload data word is based on the results of performing one or more bit flips. E.g., single bit flip, or number of bit flips.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of processing signals the method comprising:
   receiving a signal transmission, the signal transmission having been encoded with a nb/mb encoding scheme that maps n-bit words to m-bit symbols, where m>n;
   for a first payload data word in the transmission, determining that the first payload data word corresponds to a valid payload data word, based on a set of known valid payload data words, and as a result, assigning a first reliability metric to bits in the first payload data word;
   for a second payload data word in the transmission, determining that the second payload data word does not correspond to a valid payload data word, and as a result, assigning a second reliability metric to bits in the second payload data word; and
   performing signal decoding using the assigned reliability metrics.

2. The method of claim 1, wherein determining that the first payload data word corresponds to a valid payload data word comprises matching the first payload data word to a payload data word in a list of known payload data words.

3. The method of claim 1, wherein determining that the second payload data word does not correspond to a valid payload data word comprises failing to match the second payload data word using comparisons to payload data words in a list of known payload data words.

4. The method of claim 1, wherein determining that the second payload data word does not correspond to a valid payload data word comprises matching the second payload data word to a known flag word using comparisons to flag words in a list of known flag words.

5. The method of claim 1, wherein determining that the second payload data word does not correspond to a valid payload data word comprises determining that the second payload data word comprises a disparity error.

6. The method of claim 5, wherein assigning a second reliability metric to bits in the second payload data word comprises assigning a lower reliability metric that is smaller than a reliability metric that would be applied if the second payload word failed to match payload data words using comparisons in a list of known payload data words or if the second payload word matched a known flag word in a list of known flag words.

7. The method of claim 5, wherein determining that the second payload data word comprises a disparity error comprises identifying a DC-balance error.

8. The method of claim 1, wherein the signal transmission comprises a free space optical transmission.

9. A receiver configured to process signals, the receiver comprising:
   a receiving transducer configured to receive a signal transmission, the signal transmission having been encoded with a nb/mb encoding scheme that maps n-bit words to m-bit symbols, where m>n;
   a reliability metric generator coupled to the receiving transducer, the reliability metric generator configured to assign reliability metrics to bits in received words based on determinations with respect to data words, corresponding valid payload data words, based on a set of known valid payload data words; and
   a decoder configured to perform signal decoding using the assigned reliability metrics.

10. The receiver of claim 9, further comprising an expected payload data words repository and wherein determinations that payload data words correspond to valid payload data words are performed by matching the received data words to payload data words in the expected payload data words repository.

11. The receiver of claim 9, further comprising an expected payload data words repository and wherein determinations that payload data words do not correspond to valid payload data words are performed by failing to match the received data words to payload data words in the expected payload data words repository.

12. The receiver of claim 9, further comprising an expected flag data words repository and wherein determinations that payload data words do not correspond to valid payload data words are performed by matching the received data words to flag data words in the expected flag data words repository.

13. The receiver of claim 9, wherein determinations that payload data words do not correspond to valid payload data words are performed determining that payload data words comprise a disparity error.

14. The receiver of claim 9, wherein the receiving transducer comprises a free space optical transducer.

15. A system comprising:
   one or more processors; and
   one or more computer-readable media having stored thereon instructions that are executable by the one or more processors to configure the system to process signals, including instructions that are executable to configure the system to perform at least the following:
      for a received signal transmission, the signal transmission having been encoded with a nb/mb encoding scheme that maps n-bit words to m-bit symbols, where m>n:
         for a first payload data word in the signal transmission, determining that the first payload data word corresponds to a valid payload data word, based on a set of known valid payload data words, and as a result, assigning a first reliability metric to bits in the first payload data word;
         for a second payload data word in the signal transmission, determining that the second payload data word does not correspond to a valid payload data word, and as a result, assigning a second reliability metric to bits in the second payload data word; and
         performing signal decoding using the assigned reliability metrics.

16. The system of claim 15, wherein determining that the first payload data word corresponds to a valid payload data word comprises matching the first payload data word to a payload data word in a list of known payload data words.

17. The system of claim 15, wherein determining that the second payload data word does not correspond to a valid payload data word comprises failing to match the second payload data word using comparisons to payload data words in a list of known payload data words.

18. The system of claim 15, wherein determining that the second payload data word does not correspond to a valid payload data word comprises matching the second payload data word to a known flag word using comparisons to flag words in a list of known flag words.

19. The system of claim 15, wherein determining that the second payload data word does not correspond to a valid payload data word comprises determining that the second payload data word comprises a disparity error.

20. The method of claim 15, wherein the signal transmission comprises a free space optical signal.

* * * * *